US007777719B2

(12) United States Patent
Zhao

(10) Patent No.: US 7,777,719 B2
(45) Date of Patent: Aug. 17, 2010

(54) SYSTEM USING A LIVING BODY AS A TRANSMISSION MEDIUM

(75) Inventor: Zhuyan Zhao, Beijing (CN)

(73) Assignee: Nokia Corporation, Espoo (FI)

( * ) Notice: Subject to any disclaimer, the term of this patent is extended or adjusted under 35 U.S.C. 154(b) by 810 days.

(21) Appl. No.: 11/624,851

(22) Filed: Jan. 19, 2007

(65) Prior Publication Data

US 2008/0174554 A1  Jul. 24, 2008

(51) Int. Cl.
*G09G 5/00* (2006.01)
*G09G 5/08* (2006.01)
*G06F 3/033* (2006.01)

(52) U.S. Cl. .................... 345/156; 345/157; 345/163
(58) Field of Classification Search ............. 345/156, 345/157, 163; 463/36, 37; 341/33
See application file for complete search history.

(56) References Cited

U.S. PATENT DOCUMENTS

| | | | |
|---|---|---|---|
| 5,914,701 A | | 6/1999 | Gersheneld et al. |
| 6,223,018 B1 | | 4/2001 | Fukumoto et al. |
| 6,754,472 B1 | * | 6/2004 | Williams et al. ............. 455/100 |
| 7,202,773 B1 | * | 4/2007 | Oba et al. ..................... 340/5.8 |
| 2004/0054825 A1 | * | 3/2004 | Wang ........................... 710/62 |
| 2004/0092296 A1 | * | 5/2004 | Minotani et al. .......... 455/575.6 |
| 2006/0022882 A1 | | 2/2006 | Gerder et al. |
| 2006/0077172 A1 | * | 4/2006 | Fukumoto et al. ........... 345/156 |

FOREIGN PATENT DOCUMENTS

EP  0843425 B1  3/2003

WO  2006054211 A1  5/2006

OTHER PUBLICATIONS

Shinagawa et al., "A Near-Field-Sensing Transceiver for Intra-body Communication Based on the Electro-Optic Effect", NTT Microsystems Integration Laboratories, NTT DoCoMo Multimedia Laboratories, Kanagawa, Japan, IEEE 7-7803-7705-2/03, 2003, pp. 296-301.

(Continued)

*Primary Examiner*—Bipin Shalwala
*Assistant Examiner*—Ilana Spar
(74) *Attorney, Agent, or Firm*—Locke Lord Bissell & Liddell, LLP

(57) ABSTRACT

A system for enabling communication between a portable computing device and a stationary computer. A user may wear the portable computing device while simultaneously using a pointing device coupled to the stationary computing device. The pointing device may be, for example, a mouse coupled to the computer via a wired USB connection and operated on top of a mouse pad. The mouse may further include at least two electrodes. A first electrode may couple to the user's hand while moving the mouse on the mouse pad. The second electrode may be coupled to the mouse pad, which may include a conductive surface that contacts with the second electrode. These electrodes couple electronically to electrodes in the portable computing device, forming a bidirectional link for exchanging information between the two devices.

42 Claims, 11 Drawing Sheets

OTHER PUBLICATIONS

Fukomoto et al., "A Broad-band Intrabody Communication System with Electro-Optic Probe", NTT DoCoMo Multimedia Laboratories, NTT Microsystems Integration Laboratories, First International Conference on Appliance Design, Kanagawa-ken, Japan, 2003, pp. 107-108.

Post et al., "Intrabody Buses for Data and Power", Physics and Media MIT Media Laboratory, Cambridge, MA 02142, IEEE 0-8186-8192-6/97, 1997, pp. 52-55.

Zimmerman, "Personal Area Networks (PAN): Near-Field Intra-Body Communication", Massachusetts Institute of Technology, Sep. 1995, pp. 1-81.

Patridge et al., "Empirical Measurements of Intrabody Communication Performance Under Varied Physical Configurations", University of Washington, Seattle, WA, Nov. 11-14, 2001, pp. 183-190.

Ruiz et al., "Propagation Characteristics of Intra-Body Communications for Body Area Networks", Graduate School of Global Information and Telecommunication Studies, Waseda University, Tokyo, Japan, IEEE 1-4244-0086-4/06, 2006, pp. 509-513.

Hachisuka et al., "Simplified Circuit Modeling and Fabrication of Intrabody Communication Devices", Graduate School of Frontier Scientes, The University of Tokyo, Japan, Research Center for Frontier Medical Engineering, Chiba University Japan, IEEE 0-7803-8952-2/05, 2005, pp. 461-464.

* cited by examiner

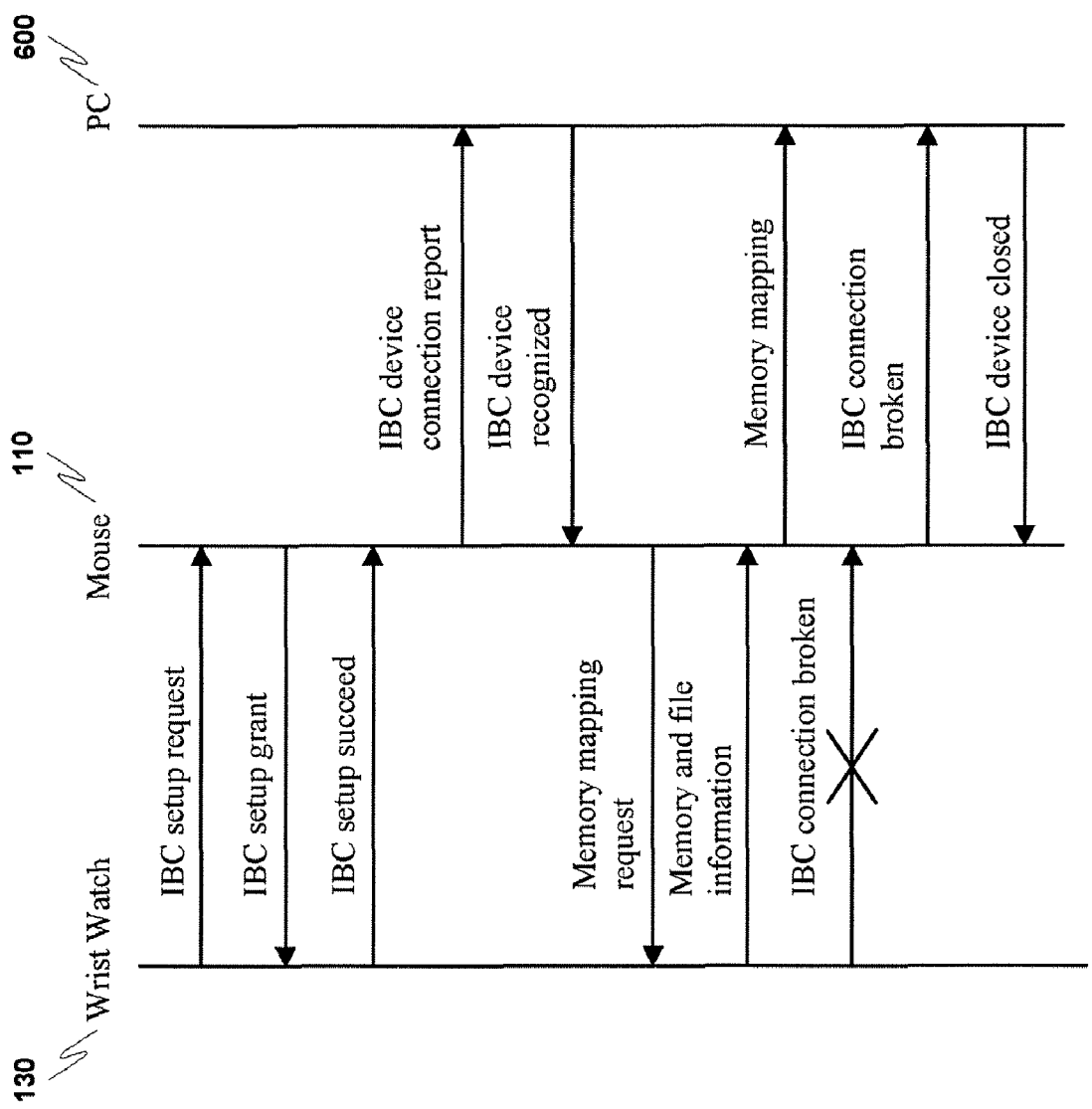

SYSTEM USING A LIVING BODY AS A TRANSMISSION MEDIUM

BACKGROUND OF INVENTION

1. Field of Invention

The present invention relates to a system for conveying information between electronic devices, and more specifically, to a system for establishing a link between an electronic device worn on a living body and another electronic device using the living body as a communication medium.

2. Description of Prior Art

Technological development is driven by many factors. One very dominant factor is the desires of the consumers in the marketplace. For example, many consumers desire that electronic devices continue to shrink while not surrendering any functionality. The effort to meet this need is evident in the trend to consolidate devices. For example, devices previously utilized for a single purpose such as cellular telephones, electronic address organizers, schedulers, digital music players, wristwatches, etc. are now being consolidated into flexible multipurpose devices. While these devices may encompass many functions, including some functions not previously available in a portable device, the first generation of these devices were larger than pocket-sized and power-hungry, leaving the consumer market still yearning for a better solution. These portable devices were functional, but they were not convenient due to their awkward bulkiness and burdensome charging requirements. As a result, there continues to be a desire to shrink these multifunction devices, as well as making them more efficient.

As developers continue to reduce device form-factor, new problems become apparent. While reduced-size devices may be convenient to carry, functional problems may negate the benefits realized in having the device on-hand. For example, a device the size of a wristwatch may be enabled to tell time and include other desirable functionality such as being able to store and retrieve personal and/or business related information such as music, contacts, appointments and other data files. These secondary functions would necessarily require the communication of information to and from the wristwatch-type device. Some method of communication would therefore be required in order to download and/or upload files, for example, digital music files for a music player or application information for synchronization. The problem then becomes apparent as how to best convey this information to another device.

The most basic solution for inter-device communication is a wired connection. The problems with using a wire to couple a portable computing device (e.g., the previously discussed wristwatch-sized multifunction device) are obvious. Hard connections require sockets or plugs in the device, exposing delicate electronics to the outside environment and jeopardizing the device if, for example, it is exposed to water or dust. Additional hardware will be needed. A connection cable is not something that a person wants to carry around. Therefore, a user may not be able to utilize a computer to interact with their device in a certain location if they are without the proper connection cable. In addition, the connection cable may have to be custom due to the size constraints of small devices, necessitating the purchase of an extra wire or cable and adding extra expense to the device. Finally, a hard connection requires a user to be tethered to a stationary device (e.g., desktop computer), which may result in impeded movement and possible damage. Removing the device is an option (e.g., a docking station), however, this may be expensive and inconvenient for the user, possibly resulting in the device being left behind.

The aforementioned inconveniences required in wired communication have led to the proliferation of devices that may communicate via wireless communication. Mediums such as Bluetooth™, Wibree™, WUSB, etc. may be utilized to communicate synchronization or other information via a wireless connection. The wireless exchange of information may be preferred over wired communication because no additional equipment (e.g., a connecting cable) is required and therefore, a user does not have to be physically tethered to a computer. However, as portable computing devices continue to shrink, new problems may arise with wireless communication.

Initially, a device must include hardware to support wireless communication. The hardware may include at least a chipset supporting wireless communication and an antenna. The chipset may comprise a wireless modem along with other resources supporting message conversion (e.g., packetizing), routing, quality, security and possibly traffic control in order to manage wireless communication. These resources require power and space, two commodities that may be scarce in a device as small as a wristwatch. In view of these limitations, smaller portable computing devices may be forced to operate under extremely low power conditions with a small antenna, limiting the effective range of the device and enhancing the effect of environmental factors on the quality of the signal. Further, supposing that the wireless communication would have to be somewhat simplified due to the aforementioned space and power limitations, there may not be adequate support for strong encryption security in the wireless communication, exposing the device to predators (e.g., man-in-the-middle attacks).

In consideration of these problems, a more power, space and security efficient system of communication is required for at least the emerging category of ultra-low power portable computing devices. The system should make use of mediums of transmission that are both low power and secure, while not having to couple or tether a portable computing device to another computing device via a special cable. Further, the system should not have to require the removal of any portable device worn on the body in order to conduct communications.

SUMMARY OF INVENTION

The present invention includes at least a system and method for facilitating the electronic conveyance of data between devices. In an exemplary situation where at least one computing device may be worn by a user and another computing device to which communication is desired remains stationary, the present invention may use the body of the user as a transmission medium for sending data in at least one direction in a bidirectional link between the devices. Communication in the other direction may be conducted through a separate medium.

In accordance with at least one embodiment of the present invention, a user may wear a portable computing device, like a multifunction wristwatch, while simultaneously using a pointing device coupled to a stationary computing device. The pointing device may be, for example, a computer mouse coupled to a desktop or laptop computer via a wired USB connection. The user may move a cursor on the screen of the stationary computing device by moving the computer mouse on a mouse pad. The exemplary computer mouse may further include at least two electrodes. A first electrode may electronically couple the computer mouse to the hand of the user while a user is operating the device. The second electrode may electronically couple the computer mouse to the mouse pad, which may allow the mouse to slide easily but also may include a conductive surface that is in contact with the second electrode.

In addition, the portable computing device worn by the user may also include at least two electrodes. For example, a first electrode may touch the skin of the user, and a second electrode may be configured to be electronically coupled to the mouse pad when the user is utilizing the computer mouse to control the stationary computing device with the hand/arm wearing the portable communication device.

In at least one scenario, when the user's hand touches the electrode on the computer mouse, a one-way communication route is formed through the skin of the user which forms an inter-body communication circuit. Then, when the user's wrist comes to rest on the mouse pad, a second one-way connection may be formed between the secondary electrodes on the computer mouse and the portable communication device coming into contact with the conductive mouse pad. In this manner, a bidirectional connection may be formed between the devices, establishing a communication link through which information may be exchanged.

DESCRIPTION OF DRAWINGS

The invention will be further understood from the following detailed description of a preferred embodiment, taken in conjunction with appended drawings, in which:

FIG. 8A discloses an exemplary communication schematic for connection establishment and link disconnection between a stationary computing device and a portable computing device in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Overview of the Components of the Present Invention

The present invention may be utilized to convey information between a device worn on the body and a stationary computing device. The information may be conveyed in a bidirectional manner. One direction may be provided via inter-body communication (IBC), while the other direction may be facilitated via an external conductive link. The combination of these two communication routes may allow the portable device to form a low power connection with the stationary computer that is immune to both environmental factors and predatory attacks.

Figure 1:
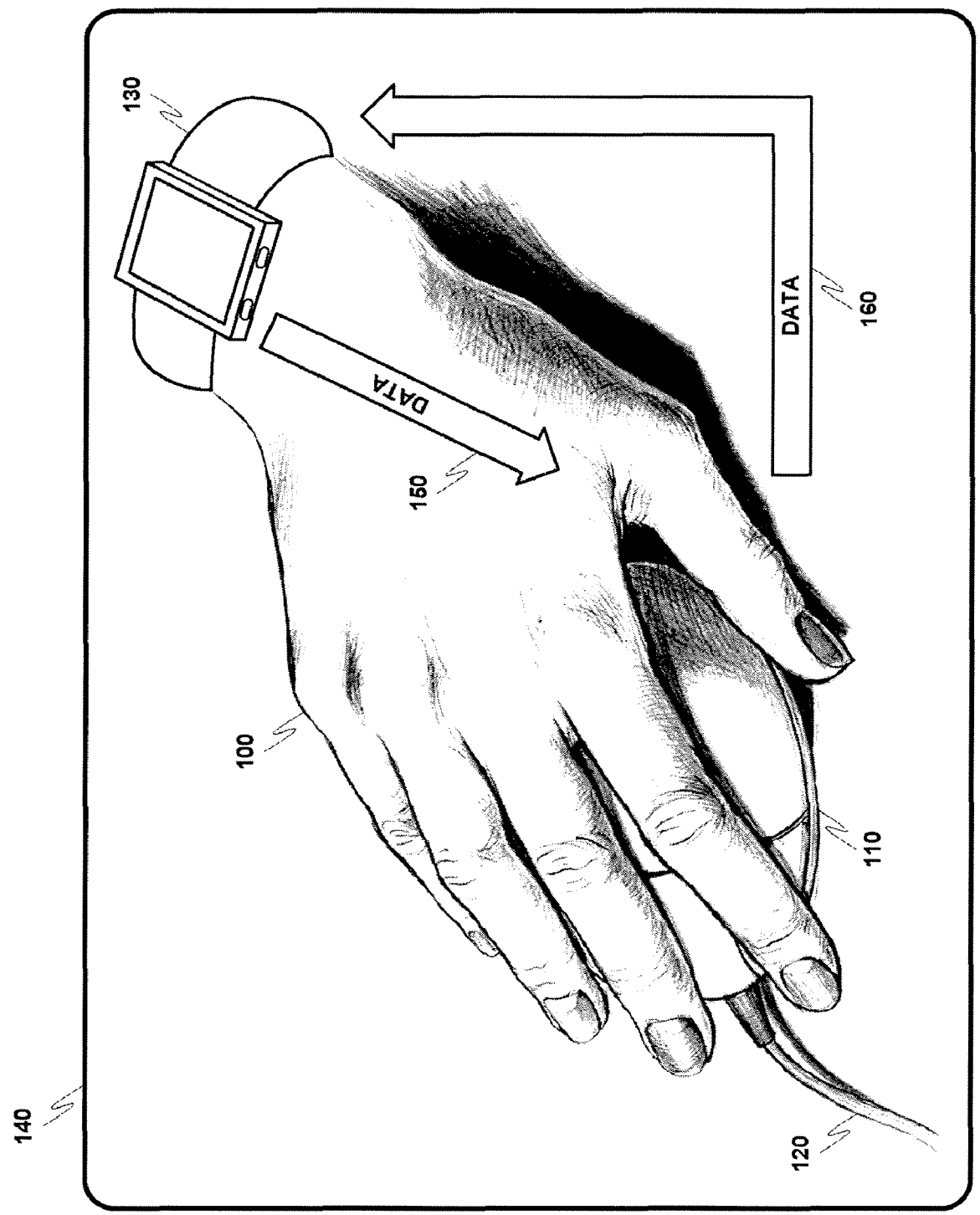
FIG. 1 discloses an exemplary portable computing device coupled to a user's arm, wherein the hand/arm is further being employed to manipulate a pointing device on a conductive planar surface in accordance with at least one embodiment of the present invention.

FIG. 1 discloses an exemplary scenario, wherein the hand 100 of a user is being used to manipulate pointing device 110. Portable computing device 130 is further coupled to the same arm as user hand 100. The pointing device is further coupled to a stationary computing device (not shown) through cable 120. The pointing device is disposed on a planar surface 140. User hand 100 may manipulate pointing device 100 on planar surface 140 in order to control a cursor on the display of the stationary computing device. As is well known in the art, moving the pointing device on planar surface 140 may cause the cursor to move in the same direction on the display of the stationary computing device at a proportional rate of speed.

FIG. 1 further demonstrates an example of data flow in accordance with at least one embodiment of the present invention. Information 150 may be transferred from portable computing device 130 to pointing device 110 through the body of the user, and then on to the stationary computing device through cord 120. Likewise, information 160 may be transferred from the stationary computer over cable 120, through pointing device 110 and planar surface 140 to portable computing device 130. It is also foreseeable that this communication path may be reversed, with portable computing device 130 transmitting data through planar surface 140 and pointing device 110, and further receiving information via IBC through pointing device 110.

Figure 2:
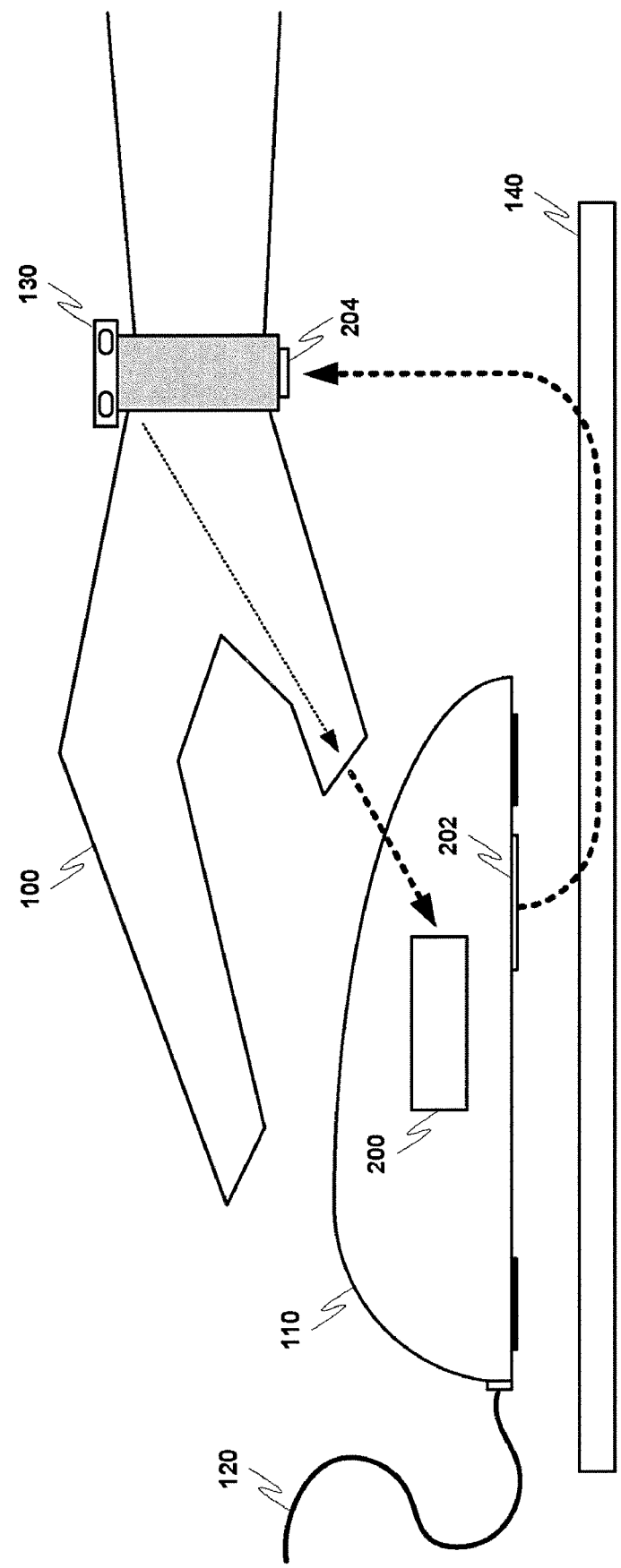
FIG. 2 discloses a side view schematic of an exemplary portable computing device coupled to a user's arm, wherein the hand/arm is further being employed to manipulate a pointing device on a conductive planar surface in accordance with at least one embodiment of the present invention.

The interaction between the various components in the system is further explained in FIG. 2. Here pointing device 110 further includes at least two electrodes 200 and 202. Electrode 200 may be coupled to user hand 100 when a user is manipulating pointing device 110. This may allow portable computing device 130 to send information (represented by the dotted arrow) through user hand 100 to pointing device 110 via IBC. Electrode 202 may be coupled to planar surface 140. When user hand 100 is actually in contact with pointing device 110 (e.g., when the user is operating the pointing device), the user's wrist may rest on planar surface 140, bringing electrode 204 into contact with planar surface 140. A conductive connection may then be established between electrodes 202 and 204 through planar surface 140, allowing information to flow in accordance with the dotted arrow also shown in FIG. 2.

II. Pointing Device

Figure 3:
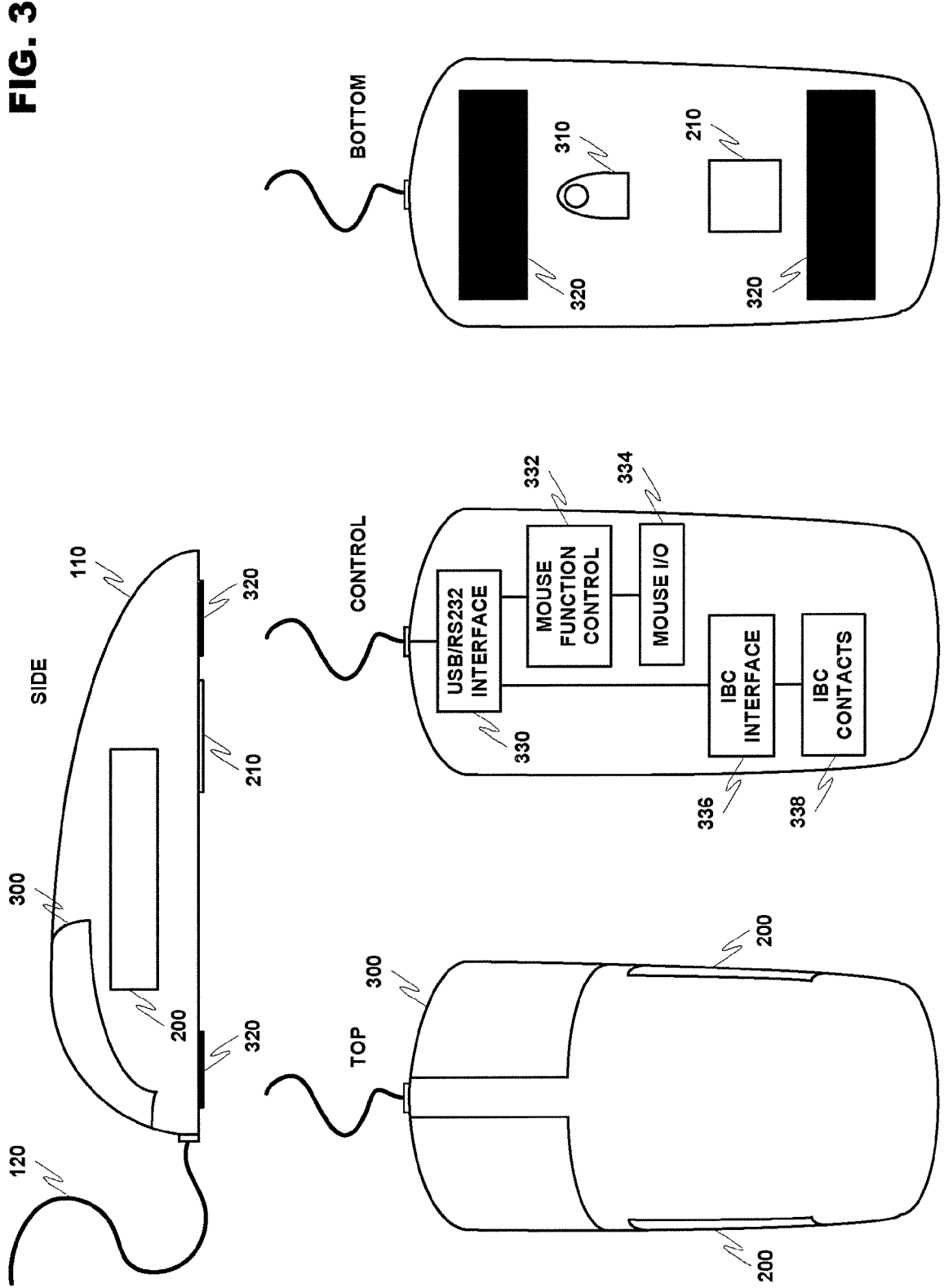
FIG. 3 discloses a schematic and functional view of an exemplary pointing device usable with at least one embodiment of the present invention.

With reference to FIG. 3, an exemplary pointing device 110 is disclosed in detail. In this instance, pointing device is disclosed a computer mouse, however, the pointing device should not be considered limited only to computer mice. Other computer pointing devices such as track balls, pen tablets, etc. are also applicable to the present invention. With this in mind, a computer mouse 110 will be utilized for the sake of explanation in the balance of the disclosure.

A side view of mouse 110 reveals that the mouse has the customary features of a computer pointing device. As discussed above, cord 120 may couple mouse 110 to a stationary computer (e.g., desktop or laptop). Mouse 110 may also include button(s) 300 for initiating action in the stationary computer. For example, a user may move the mouse until the cursor points to a file icon, and then actuate button(s) 300 in order to initiate an action in the stationary computing device related to the file. Pads 320 are optional depending on the design of mouse 110, and may be set on the same level as electrode 210 in order to allow the electrode to contact planar surface 140 while providing fluid sliding movement for mouse 110. Further, electrode 200 is disposed to provide contact with user hand 100, and may be disposed on either side or both sides of mouse 110 to allow for use by both left and right handed people.

The top view of mouse 110, as shown in lower left corner of FIG. 3, includes two button(s) 300 as is customary in many PC-based computers running operating systems such as Microsoft Windows™ or Linux. However, the button(s) 300 configuration may vary depending on the stationary computer to which connection is desired. For example, Apple™ computers running OS-X™ may only require one button(s) 300. Other controls, such as scroll wheels, may also be included in mouse 110, but are not shown. Electrode 200 is also seen in the top view. As previously stated, electrode 200 may be disposed on either side or both sides of mouse 110 in order to accommodate both right and left handed users.

The bottom of mouse 110, as shown in FIG. 3, may include one or more pads 320 and motion sensor 310 as typically may be found in a computer mouse. Pads 320 may be made of the same material as the body of mouse 110 or a different material, and may be disposed on the bottom of the mouse to aid in sliding mouse 110 across planar surface 140. Motion sensor 310 may be either electro-mechanical, such as in the case as a ball-type sensor apparatus, or electronic as commonly seen in optical mice. Electrode 210 is also shown on the bottom of mouse 110. This sensor may come into contact with planar surface 140 in order to convey information between a stationary computer and portable computing device 130.

A functional diagram of the control aspects of mouse 110 is also shown in FIG. 3. USB/RS232 interface 330 is shown coupled to cable 120. This interface may convert information from mouse 110 to a format (e.g., USB or RS232) that may be interpreted by the stationary computing device. Various other modules may route information for the stationary computing device through USB/RS232 interface 330. For example, mouse function control module 332 receives information from mouse I/O 332 for interpretation and transmission to the stationary computing device. Mouse I/O 332 may include at least motion sensor 310 and one or more button(s) 300. Mouse function control module 332 may interpret the information received from Mouse I/O in terms of motion or action, and then transmit this information to a stationary computer via USB/RS232 interface 330. Mouse 110 may also receive information from (and convey information to) portable computing device 130 through IBC interface 336. IBC interface 336 receives information from IBC contacts 338, and may further convert or format (e.g., packetize) this information prior to conveyance to the stationary computer through USB/RS232 interface 330. These contacts may include electrodes 200 and 210. Likewise, IBC interface 336 may receive information from the stationary computer through USB/RS232 interface 330, prepare this information for transmission, and then transmit the information through IBC contacts 338 to portable computing device 130.

III. Portable Computing Device

Figure 4:
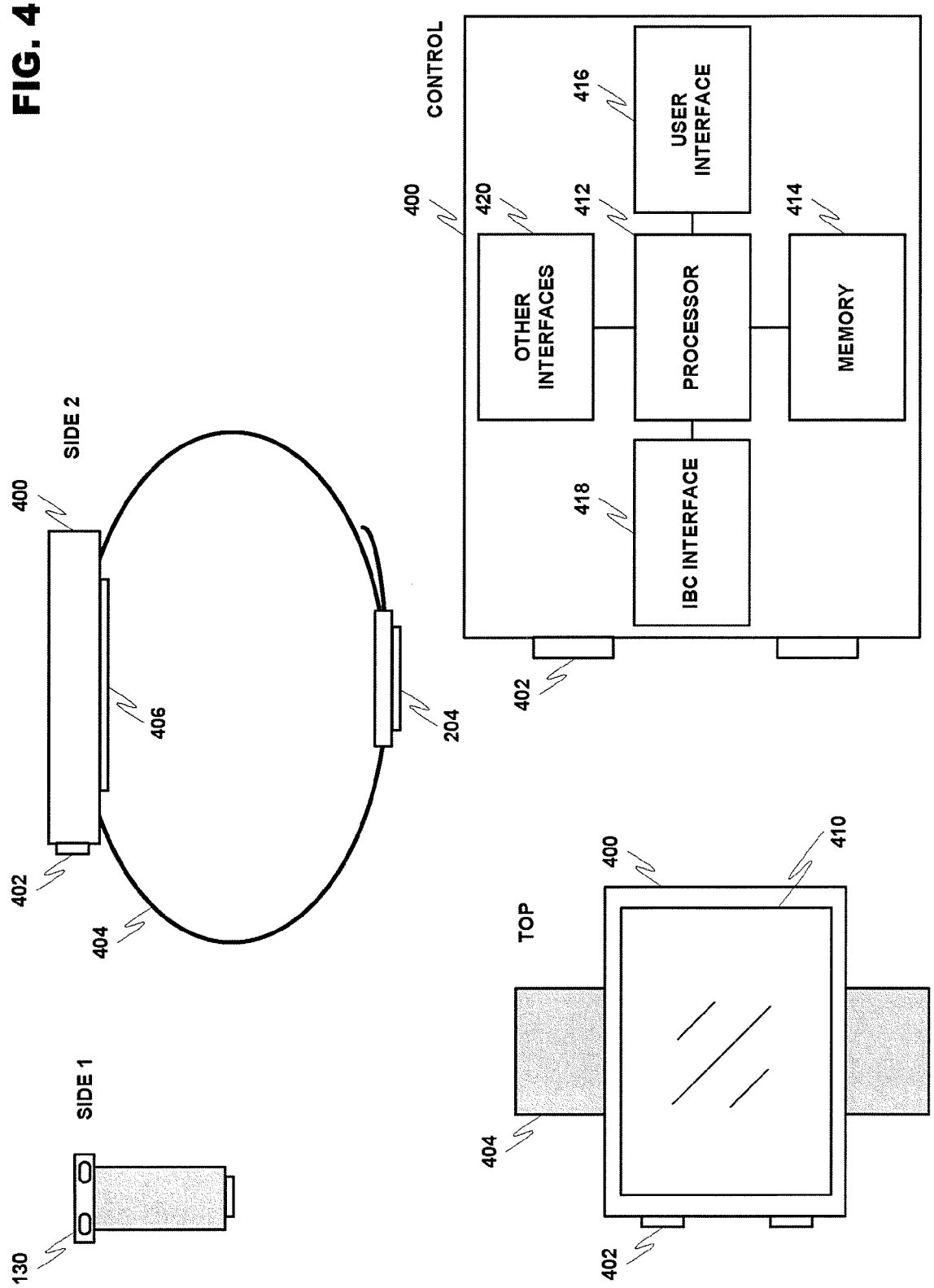
FIG. 4 discloses a schematic and functional view of an exemplary portable computing device usable with at least one embodiment of the present invention.

FIG. 4 discloses an exemplary portable computing device 130 in accordance with at least one embodiment of the present invention. Portable computing device 130 has been shown as a wristwatch-type multifunction device for the sake of explanation in the disclosure, however, this embodiment should not be deemed as limiting in scope to the present invention. Any device that may be similarly employed to communicate via IBC may usable in the practice of the present invention. The "SIDE 1" view disclosed in FIG. 4 is similar to the view previously presented in FIG. 2. A more detailed "SIDE 2" is now discussed in order to better understand the various elements of the device. A wristwatch-type portable computing device 130 may include at least a body 400 and strap 404. The body of the device may further include controls 402 as a part of an overall user interface scheme so that a user may issue commands to the device. Portable computing device 130 may also include at least two electrodes 406 and 204. Electrode 406 is designed to come into contact with the wrist of a user when portable computing device 130 is worn. Electrode 204 may come into contact with planar surface 140 when a user is operating mouse 110. In this way, bidirectional communications may be established when both electrodes 406 and 204 are coupled to electrodes 200 and 210 in mouse 110 through IBC and planar device 140, respectively.

A top view of portable computing device 130 further reveals that the user interface may further include display 410. Display 410 may be, for example, a liquid crystal display (LCD), a light emitting diode display (LED), organic light emitting device (OLED), etc. Display 410 may display information such as the time and date, an operating system interface, applications, video programs, etc. In utilizing the user interface, a user may input commands to portable computing device 130 through controls 402 in order to implement actions in the device, the results of which may be seen on display 410. Controls 402 may include buttons, wheels, toggles, joysticks, touch pads, etc., and may vary depending on the functionality incorporated into portable computing device 130. The user interface may also include other indicators such as individual LEDs, and an audio device such as a speaker, all of which are not shown in FIG. 4.

An example of various functional aspects that may be included in portable computing device 130 is disclosed in FIG. 4. Processor 412 may receive information from various modules, and in response, control various aspects of portable computing device 130. Memory 414 may consist of static and/or dynamic memory for storing instructions, applications, data, files, etc. for use by processor 412. As processor receives inputs through user interface 416 (e.g., through controls 402), information in memory 414 may be accessed, processed and sent to display 410 for presentation to the user. This presentation may include visual and/or audio playback in the form of menus, application interfaces, multimedia players, etc. IBC interface 418 may be used to sense conditions indicating a connection between portable computing device 130 and another device is possible, as well as establishing and managing a communication link to another device. Processes that may occur in IBC interface 418 include various actions that may take place in order to prepare information for transmission through IBC or through planar surface 140, as well as converting received information for use by portable computing device 130. Other interfaces 420 may also be used to send and receive signals from portable computing device 130, and may include, for example, sensors, wireless communications to other electronic devices, a wired connection to a stationary computing device without an IBC enabled pointing device 110, power couplings for recharging a battery in portable computing device 130, etc.

IV. Planar Surface

Figure 5:
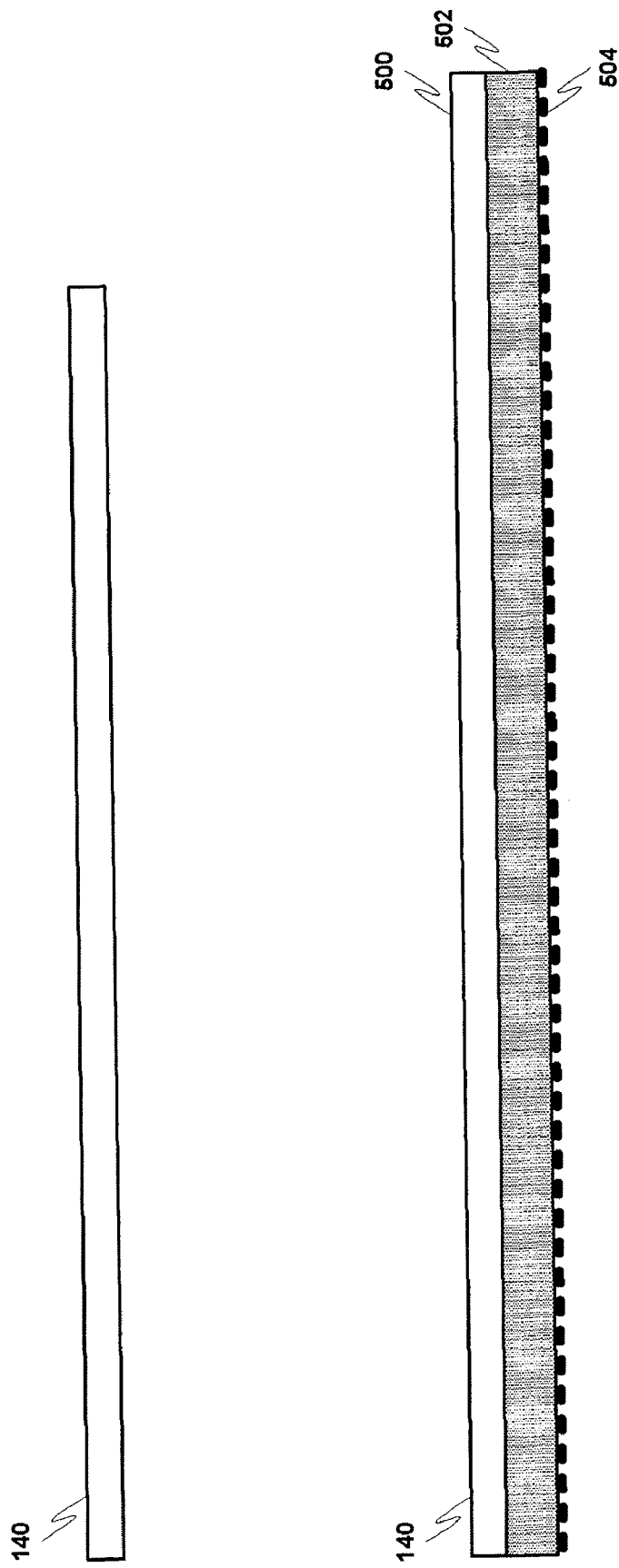
FIG. 5 discloses a schematic view of an exemplary planar surface usable with at least one embodiment of the present invention.

FIG. 5 discloses an exemplary planar surface 140 that may be employed in the practice of at least one embodiment of the present invention. Planar surface 140, in accordance with the examples previously set forth, may be a mouse pad usable with mouse 110. Planar surface 140, however, is not limited to this example and may also be any planar surface enabled to electrically couple electrodes in mouse 110 to portable computing device 130.

An exemplary composition of mouse pad 140 is further described in FIG. 5 to include various functional layers. Surface 500 may be a conductive layer suitable for electrically coupling electrodes 202 and 204. This surface may also be smooth and pliable in order to provide a work surface across which a pointing device like mouse 110 may be slid. Support layer 502 may be a soft pliable layer in order to provide resilient support for mouse 110 and user hand 100. Foam rubber is an exemplary material that is typically used in mouse pads, and may add the additional benefit of insulating the electrical connection formed by surface 500 from other objects in proximity of mouse pad 140 on a table top or desk. Further, bottom surface 504 may also be a pliable material, but should also include some gripping or frictional aspect in order to hold the mouse pad 140 in place while a user is operating mouse 110. Rubber is an example of a material that may provide the appropriate frictional, flexibility and insulating properties.

V. System Operation

Figure 6:
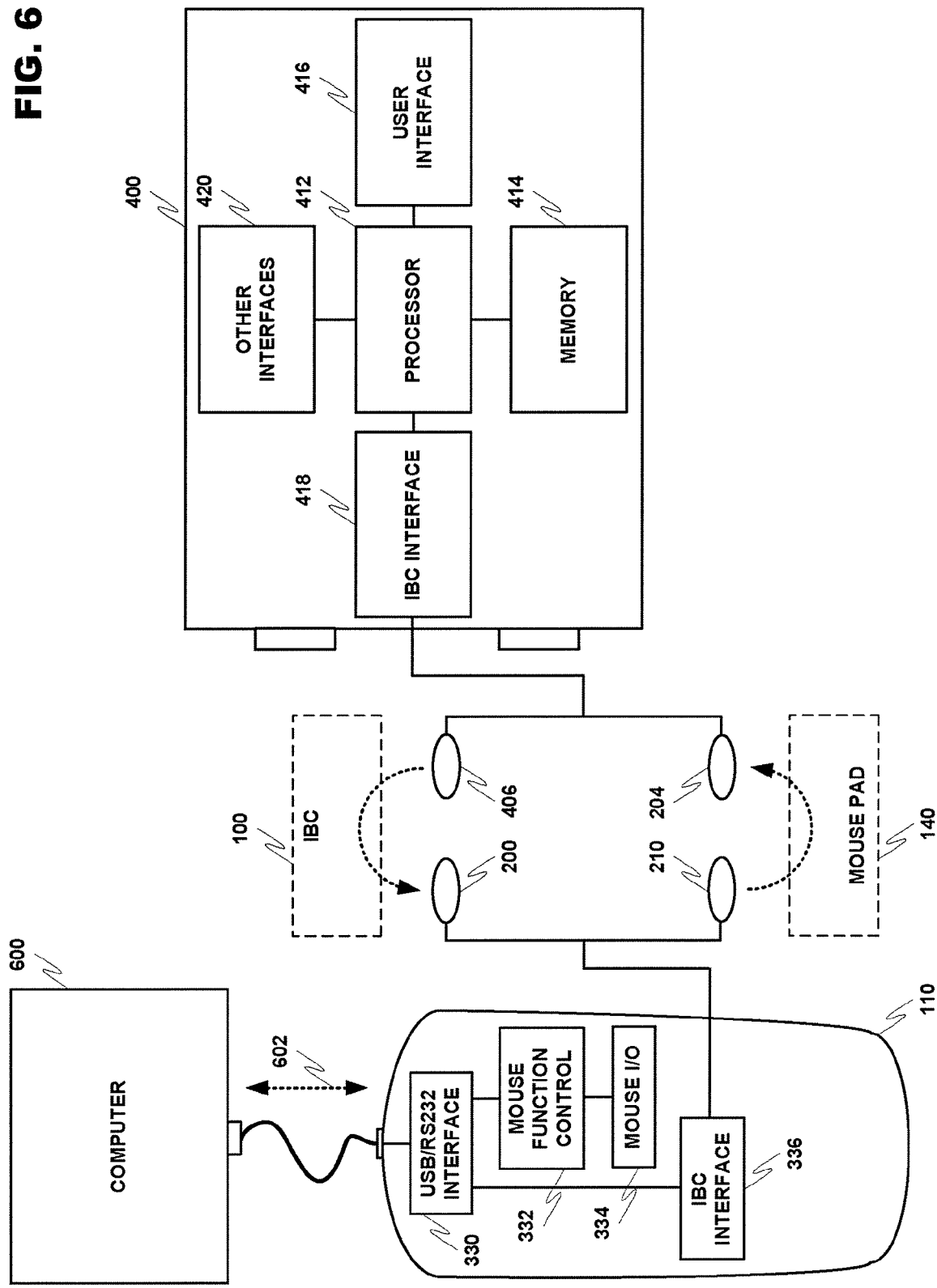
FIG. 6 discloses a functional diagram of a stationary computing device, a pointing device and a portable computing device interacting in accordance with at least one embodiment of the present invention.

FIG. 6 is a systemic diagram in accordance with at least one embodiment of the present invention. A stationary computing device (e.g., computer 600) may be coupled to and engage in bidirectional communication 602 with mouse 110. This coupling may occur through USB/RS232 Interface 330. Mouse 110 may further be coupled to portable computing device 130 through a bidirectional connection formed through diverse mediums. IBC interface 336 may send and receive information through electrodes 200 and 210. Electrode 200 may be electrically coupled to electrode 406 through IBC connection 100. Electrode 210 may likewise be electrically coupled to electrode 204 through mouse pad 140. Electrodes 406 and 204 may then send and receive information through IBC interface 418 located in the body 400 of portable communication device 130.

Figure 7:
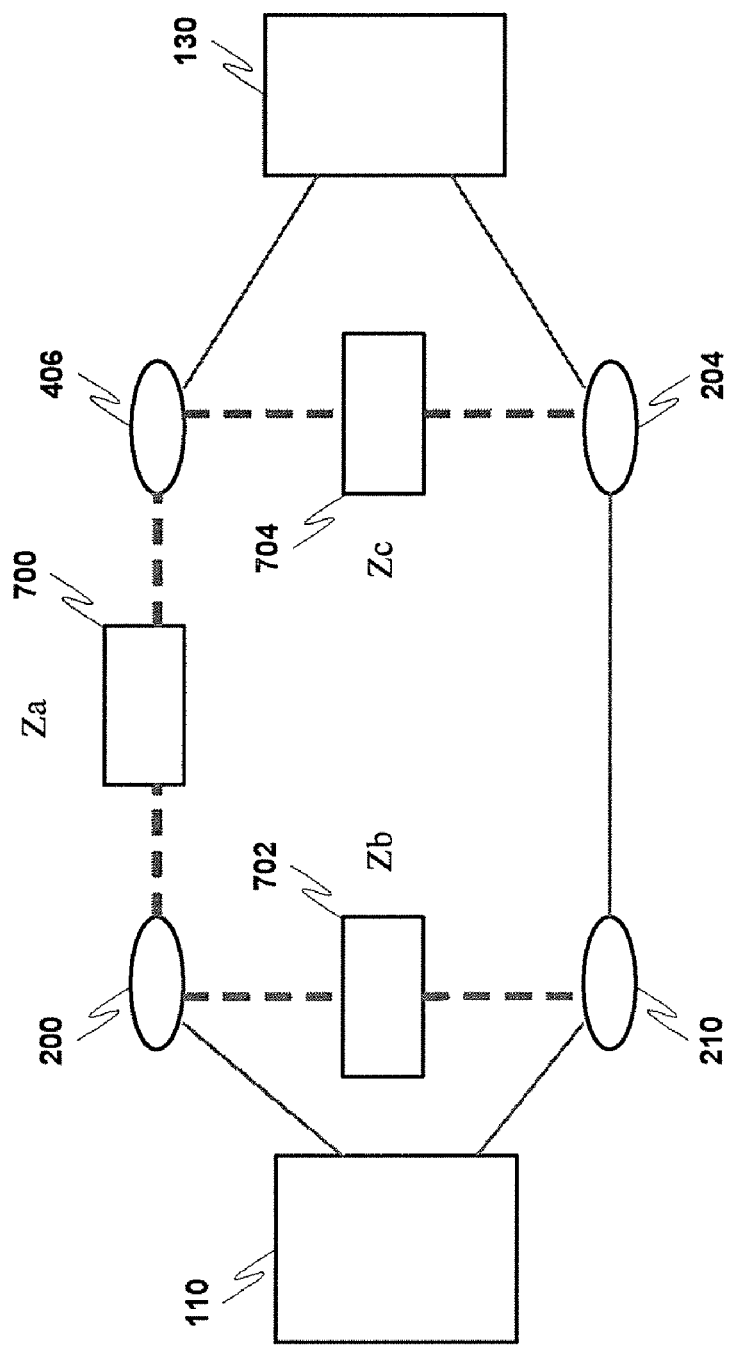
FIG. 7 discloses an exemplary equivalent circuit model of an inter-body communication circuit usable with at least one embodiment of the present invention.

In configuring the present invention, certain values may require computation related to the transmission properties of the various communication mediums. FIG. 7 discloses an exemplary equivalent circuit model representing a communication loop usable with at least one embodiment of the present invention. Applying the previously discussed system components to this model, mouse 110, including electrodes 200 and 210, and portable computing device 130, including electrodes 406 and 204, may be coupled together. Electrodes 200 and 406 are coupled via an IBC connection. Using the human body as a conductor imparts a horizontal impedance element of the skin (Za) 700, a vertical impedance element of the skin (Zb) 702 and a secondary vertical impedance element of the skin (Zc) 704 to the model. The electrodes 210 and 204 are coupled via mouse pad 140, therefore, the impedance related to this connection is near zero. Using these values, the transmission gain of the inter-body transmission (G) may be derived using the equation also shown in FIG. 7. As a result, An appropriate power requirement may then be determined for either device when transmitting communication signals using IBC.

Figure 8B:
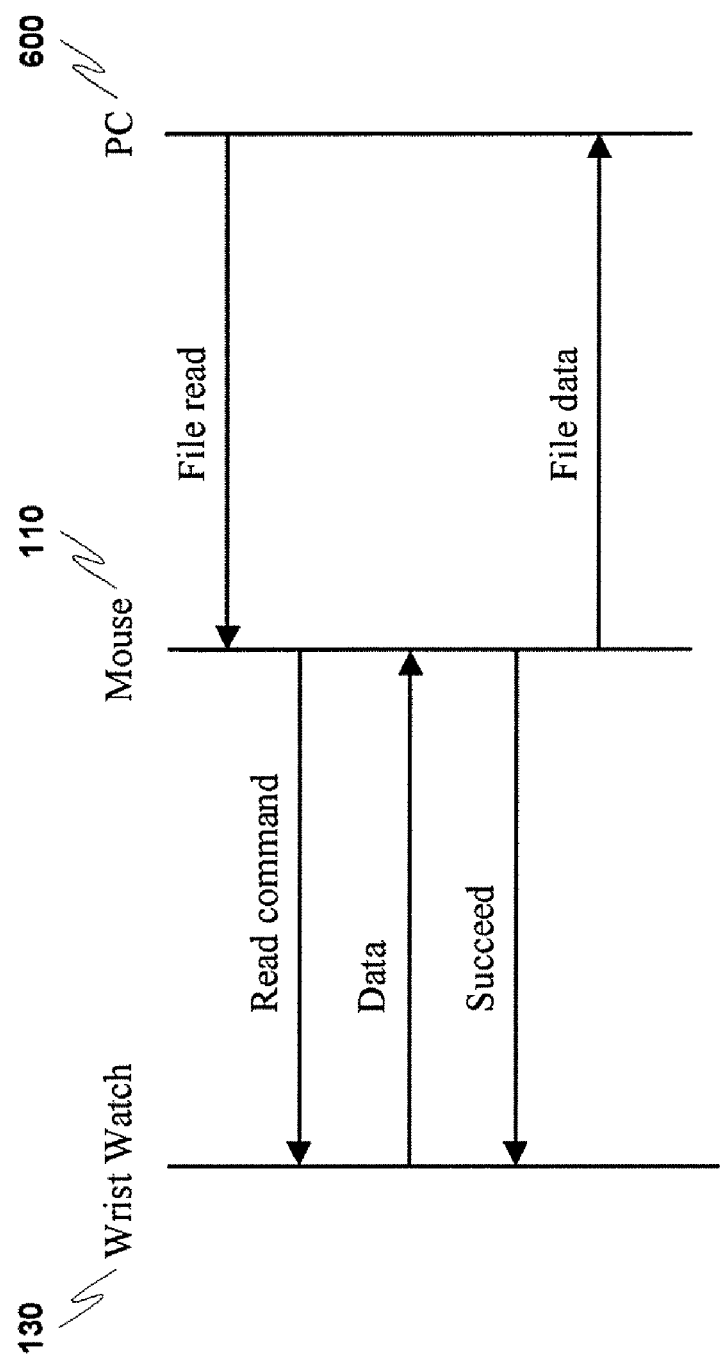
FIG. 8B discloses an exemplary communication schematic for conveying files between a stationary computing device and a portable computing device in accordance with at least one embodiment of the present invention.

FIG. 8A discloses an exemplary communication establishment diagram in accordance with at least one embodiment of the present invention. In this example, a user is wearing portable computing device 130 ("wristwatch") on the same arm as the hand used to operate a pointing device 110 ("mouse") which is further coupled to a stationary computer ("PC") 600. Initially, wristwatch 130 may detect a connection has been formed with mouse 110 and send an electronic setup request ("IBC setup request") to mouse 110. This detection may occur in various ways. For example, mouse 110 may periodically send a beacon signal through one or both of electrodes 200 and 210, which would be detectable by wristwatch 130 when a conductive connection is made. Alternatively, wristwatch 130 could periodically transmit a beacon signal and await a reply from mouse 110.

When mouse 110 receives the connection request, a reply message granting the setup ("IBC setup grant") may be returned to wristwatch 130. The setup grant completes the communication loop, and confirms that a bidirectional communication has been established to wristwatch 130. The wristwatch may then confirm the success of the connection setup ("IBC setup succeed") to mouse 110. In this message, wristwatch 130 may also include identifying information and security information that may be required by PC 600. This information may include a device identification, user identification, device type/manufacturer identification, password information, etc. Some or all of this information may be forwarded by mouse 110 to PC 600 ("IBC device connection report"). PC 600 may then use this information to grant security clearance to wristwatch 130 and to initiate any applications that will be necessary in further communications. PC 600 may then acknowledge that the device is recognized and communication is accepted ("IBC device recognized"). Otherwise, PC 600 may return an error, which may require information to be resubmitted by one or both of wristwatch 130 or mouse 110, or may result in a message on display 410 of wristwatch 130 regarding connection failure.

If the connection is accepted and wristwatch 130 is identified, PC 600 may further request memory map information from wristwatch 130 ("Memory mapping request"). This information may allow applications on PC 600 to retrieve and update information in wristwatch 130. A reply including this information may then be forwarded through mouse 110 to PC 600 ("Memory and file information" and "Memory mapping"). If at any time during this initial transaction the connection is broken ("IBC connection broken") mouse 110 may report that bidirectional communication has been broken ("IBC connection broken") and the IBC link and applications related to the IBC link may be disabled or closed on PC 600 ("IBC device closed").

If the initialization connection as previously described proceeds without error, and the connection is not broken, then a link between wristwatch 130 and PC 600 is formed through mouse 110, and information may be exchanged between the two devices. This information may include data files such as audio files, video files, scheduling synchronization files, email, etc. that may by uploaded from and/or downloaded to wristwatch 130. An exemplary process for reading files is disclosed in FIG. 8B. PC 600 may request files to be read from wristwatch 130 ("File read"). This request may be for a particular file or for files of a particular type, date, size, etc. The request may then transferred to wristwatch 130 by mouse 110 ("Read command"). Wristwatch 130 may then send the requested date to mouse 110 ("Data"). Due to the changing nature of the IBC/planar surface connection between wristwatch 130 and mouse 110, a confirmation may be sent ("Succeed") to confirm to wristwatch 130 that all information sent by wristwatch 130 was received by mouse 110. Otherwise, a retransmission may occur. Mouse 110 may then forward this information to PC 600 ("File data"). While not shown, PC 600 may also send information to be stored on wristwatch 130 using a similar process. Wristwatch 130 may then confirm that the information sent by PC 600 was received and stored successfully. A confirmation may be important where the memory of a portable computing device is limited.

In an exemplary application of the present invention, a user may interact with computer 600 through pointing device 110 while wearing portable computing device 130. The user may access an application or an Internet webpage that contains information regarding textual information, application data, music and/or video information ("multimedia" information) for download. Pointing device 110 may then be used to select the information for download to portable computing device 130. If computer 600 is aware of the presence of portable computing device 130, an option may be presented to download directly to the portable device. The desired information may then be downloaded through computer 600 and pointing device 110 to portable computing device 130 through IBC. Playback may occur later through user interface 416 on portable computing device 130. In another scenario, information stored on portable computing device 130 may be transmitted to another device (e.g., headphones, an MP3 player, another computer 600) via IBC or another method of transmission encompassed by other interfaces 420 (such as short-range wireless communication, wired communication, etc.)

Figure 9A:
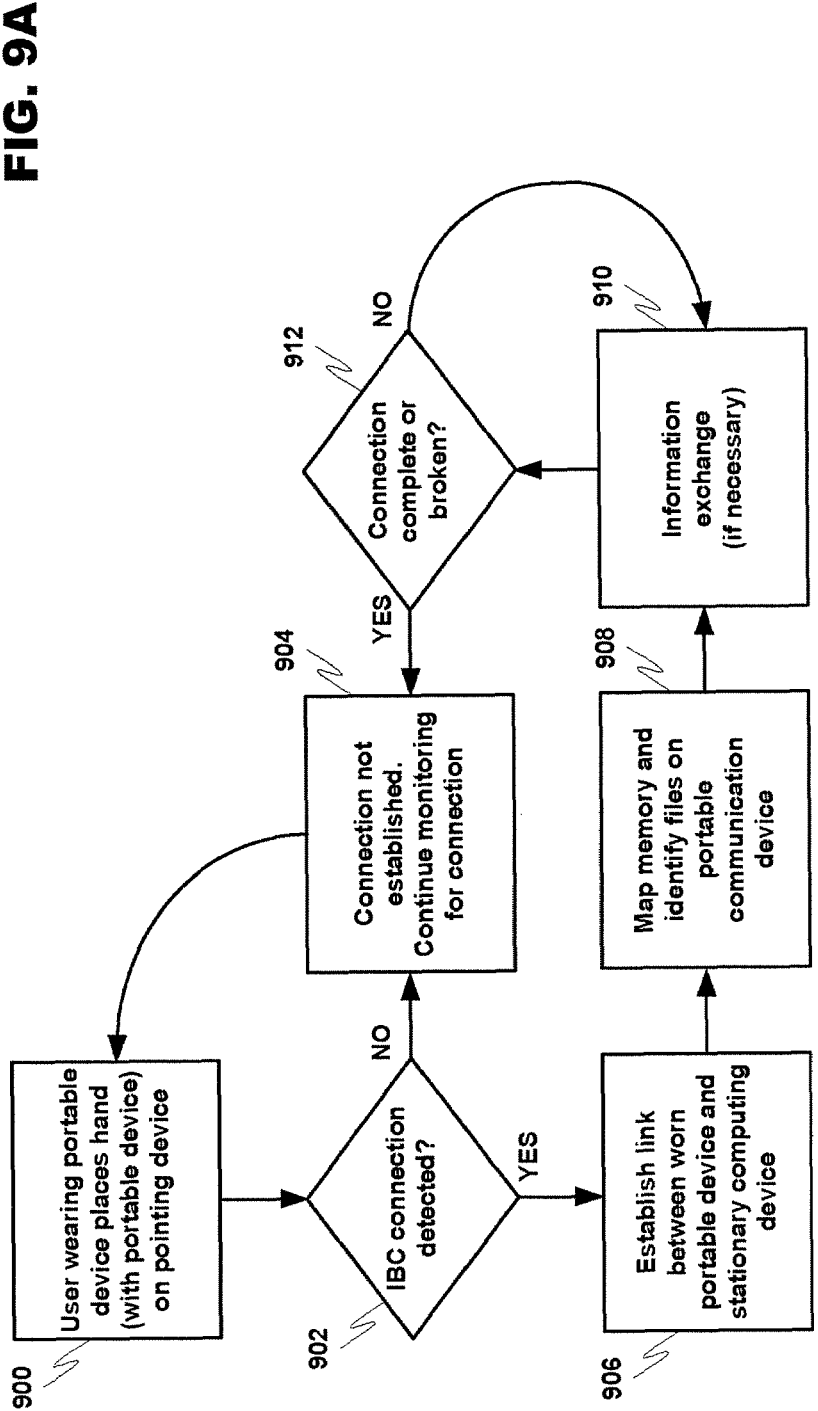
FIG. 9A discloses a flow chart for communications between a stationary computing device and a portable computing device in accordance with at least one embodiment of the present invention.
Figure 9B:
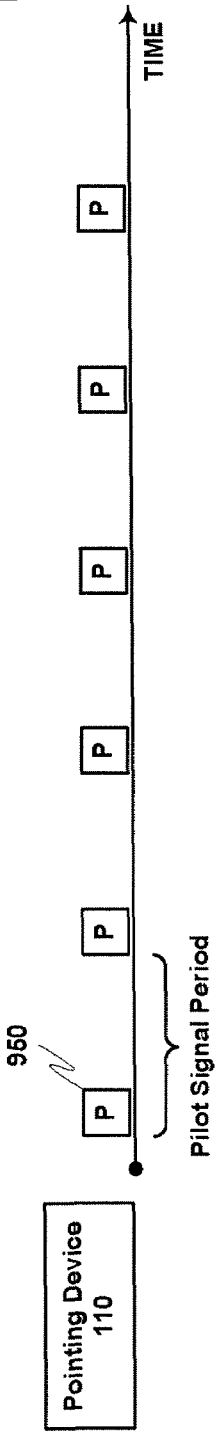
FIG. 9B discloses an exemplary IBC pilot signal in accordance with at least one embodiment of the present invention.

FIG. 9A discloses a flowchart describing an exemplary procedure for establishing a link and exchanging information between portable computing device 130 and stationary computing device 600 in accordance with at least one embodiment of the present invention. In step 900, a user wearing portable computing device 130 places their hand (e.g., the hand/arm containing the device) in contact with pointing device 110. Portable computing device 130 may then determine whether an IBC connection is established in step 902. An exemplary method for detecting the existence of an IBC connection may be facilitated by pointing device 110 repeatedly transmitting an IBC pilot signal in a fixed period. This pilot signal may include a pseudorandom binary sequence recognizable by portable computing device 130. An example of generating and sending a pilot signal 950 in accordance with a predetermined protocol is shown in FIG. 9B. When the IBC pilot signal is detected, portable computing device 130 may learn at least three pieces of information: IBC signal strength, synchronization information (e.g., frame synchronization and chip synchronization information), and access information (e.g., when to send an access beacon signal). In monitoring for the IBC pilot signal, portable computing device 130 may learn of the existence of a pointing device 110 that supports IBC. If no connection is made, then in step 904 portable computing device 130 may continue to monitor for a connection.

If the connection has been established, then in step 906 portable computing device 130 may establish a link with stationary computing device 600. This link establishment may include the identification of portable computing device 130 and the provision of security information. Once the link has been established, information as to the memory mapping and the files contained on portable computing device 130 may be provided to stationary computing device 600 in step 908. This information may be used to determine whether information needs to be exchanged in step 910. In at least one scenario, information may not need to be exchanged between the devices if the information on portable computing device 130 is already current (e.g., it has already been updated). The information exchange may continue until the exchange is complete or the connection is broken (step 912). In this case, the process may return to step 904, wherein the system continues to monitor for the establishment of a bidirectional connection.

Figure 10:
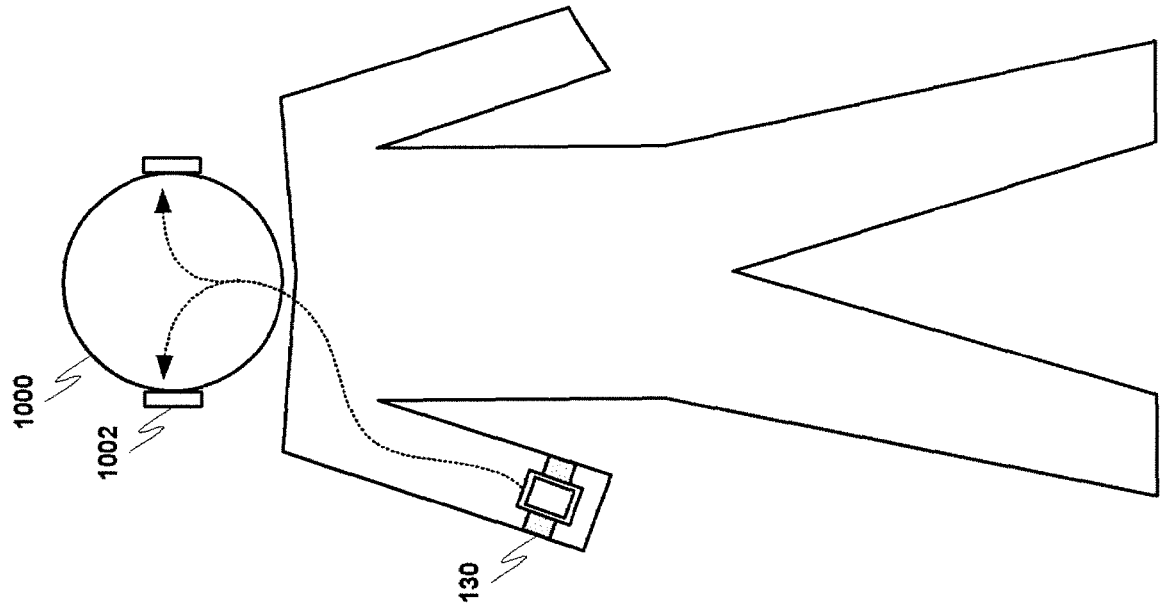
FIG. 10 discloses an exemplary alternative mode on operation for the portable computing device in accordance with at least one embodiment of the present invention.

FIG. 10 demonstrates another example of the present invention, wherein portable computing device 130 is being employed in an alternative mode. Even when not coupled to mouse 110 (and hence to computer 600), electrode 406 may still be in contact with the skin of user 1000. This would be the case, for instance, when device 130 is multifunction device worn on the wrist like a wristwatch. In such a configuration, electrode 406 may be utilized to send IBC communication to other portable devices also in contact with the skin of user 1000. In this example, user 1000 may be wearing headphones 1002 that are enabled to receive information via IBC, and as a result, can reproduce audio signals sent via IBC from portable computing device 130 at a lower power level requirement than popular forms of wireless communication and without experiencing interference from environmental factors.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    detecting physical contact between the hand of a user and a first electrode of at least two electrodes on a body portion of a pointing device, the pointing device being further coupled to a computing device;
    transmitting an initialization message to the pointing device through the first electrode of the at least two electrodes, the first electrode being in physical contact with the hand of the user;
    receiving a confirmation message from the pointing device establishing a communication link through a second electrode of the at least two electrodes, the second electrode being in physical contact with a conductive surface; and
    communicating information over the communication link by sending information through the first electrode and receiving information from the second electrode, wherein the pointing device converts the received information to a communication medium suitable for the computing device.

2. The method of claim 1, wherein the pointing device is a computer mouse communicating with the computing device via a wired connection utilizing USB communication.

3. The method of claim 1, wherein the initialization message is transmitted from a portable computing device also coupled to the body of the user through an electrode.

4. The method of claim 1, wherein the initialization message includes at least a request to set up a communication link through inter-body communication (IBC).

5. The method of claim 1, wherein the second electrode is in contact with a conductive planar surface on which the pointing device is moved in order to actuate a cursor on the computing device.

6. The method of claim 5, wherein a portable computing device worn by the user is also coupled to the conductive planar surface through an electrode in order to communicate with the second electrode.

7. The method of claim 1, wherein the first electrode is the receiving electrode and the second electrode is the sending electrode.

8. The method of claim 1, wherein communicating information includes communicating at least device identification information and a memory map from a portable computing device coupled to the user.

9. A computer program product comprising computer executable program code recorded on a computer readable storage medium, the computer executable program code comprising:
    code for detecting physical contact between the hand of a user and a first electrode of at least two electrodes on a body portion of a pointing device, the pointing device being further coupled to a computing device;
    code for transmitting an initialization message to the pointing device through the first electrode of the at least two electrodes, the first electrode being in physical contact with the hand of the user;
    code for receiving a confirmation message from the pointing device establishing a communication link through a second electrode of the at least two electrodes, the second electrode being in physical contact with a conductive surface; and
    code for communicating information over the communication link by sending information through the first electrode and receiving information from the second electrode, wherein the pointing device converts the received information to a communication medium suitable for the computing device.

10. The computer program product of claim 9, wherein the pointing device is a computer mouse communicating with the computing device via a wired connection utilizing USB communication.

11. The computer program product of claim 9, wherein the initialization message is transmitted from a portable computing device also coupled to the user through an electrode.

12. The computer program product of claim 9, wherein the initialization message includes at least a request to set up a communication link through inter-body communication (IBC).

13. The computer program product of claim 9, wherein the second electrode is in contact with a conductive planar surface on which the pointing device is moved in order to actuate a cursor on the computing device.

14. The computer program product of claim 13, wherein a portable computing device worn by the user is also coupled to the conductive planar surface through an electrode in order to communicate with the second electrode.

15. The computer program product of claim 9, wherein the first electrode is the receiving electrode and the second electrode is the sending electrode.

16. The computer program product of claim 9, wherein communicating information includes communicating at least device identification information and a memory map from a portable computing device coupled to the user.

17. A device, comprising:
    a body and a strap for coupling the device to the wrist of a user;
    the body further including a computing section and a user interface;
    the strap and/or body further including at least two electrodes, the at least two electrodes being disposed to electronically couple the device to the wrist of the user and to a conductive surface through physical contact between at least one of the at least two electrodes and the wrist of the user, as well as through physical contact between at least one other electrode of the at least two electrodes and the conductive surface.

18. The device of claim 17, wherein the computing section further includes at least a processor, memory and one or more communication interfaces.

19. The device of claim 18, wherein at least one communication interface is enabled to transmit and receive electronic messages through inter-body communication.

20. The device of claim 17, wherein the user interface includes at least a video display and controls enabling a user to control the device.

21. A method, comprising:
    receiving an initialization message from a portable computing device coupled through the hand of a user to a first electrode of at least two electrodes on a body portion of a pointing device, the first electrode being in physical contact with the hand of the user;
    sending a confirmation message to the portable computing device establishing the connection through a second electrode of the at least two electrodes, the second electrode being in physical contact with a conductive surface; and
    communicating information to the portable computing device by receiving information through the first electrode in the pointing device and sending information from the second electrode in the pointing device, wherein the pointing device converts the received information to a communication medium suitable for the portable computing device.

22. The method of claim 21, wherein the pointing device is used to actuate a cursor on a display of the computing device.

23. The method of claim 22, wherein the pointing device is a computer mouse communicating with a computing device via a wired connection utilizing USB communication.

24. The method of claim 21, wherein the initialization message includes at least a request to set up a communication link through inter-body communication (IBC).

25. The method of claim 21, wherein the second electrode is in contact with a conductive planar surface on which the pointing device is moved in order to actuate a cursor on the computing device.

26. The method of claim 25, wherein the portable computing device is also coupled to the conductive planar surface through an electrode in order to communicate with the second electrode.

27. The method of claim 21, wherein the first electrode is the sending electrode and the second electrode is the receiving electrode.

28. The method of claim 21, wherein communicating information includes communicating at least device identification information and a memory map from a portable computing device coupled to the user.

29. A computer program product comprising computer executable program code recorded on a computer readable storage medium, the computer executable program code comprising:
- code for receiving an initialization message from a portable computing device coupled through the hand of a user to a first electrode of at least two electrodes on a body portion of a pointing device, the first electrode being in physical contact with the hand of the user;
- code for sending a confirmation message to the portable computing device establishing the connection through a second electrode of the at least two electrodes, the second electrode being in physical contact with a conductive surface; and
- code for communicating information to the portable computing device by receiving information through the first electrode in the pointing device and sending information from the second electrode in the pointing device, wherein the pointing device converts the received information to a communication medium suitable for the portable computing device.

30. The computer program product of claim 29, wherein the pointing device is used to actuate a cursor on a display of the computing device.

31. The computer program product of claim 30, wherein the pointing device is a computer mouse communicating with a computing device via a wired connection utilizing USB communication.

32. The computer program product of claim 29, wherein the initialization message includes at least a request to set up a communication link through inter-body communication (IBC).

33. The computer program product of claim 29, wherein the second electrode is in contact with a conductive planar surface on which the pointing device is moved in order to actuate a cursor on the computing device.

34. The computer program product of claim 33, wherein the portable computing device is also coupled to the conductive planar surface through an electrode in order to communicate with the second electrode.

35. The computer program product of claim 29, wherein the first electrode is the sending electrode and the second electrode is the receiving electrode.

36. The computer program product of claim 29, wherein communicating information includes communicating at least device identification information and a memory map from a portable computing device coupled to the user.

37. A pointing device, comprising:
- a body and a cord coupling the pointing device to a stationary computing device;
- the body further including control buttons, a sensor for interpreting motion and at least two electrodes, the at least two electrodes being disposed to electronically couple the device to the hand of a user and to a conductive surface through physical contact between at least one of the at least two electrodes and the wrist of the user, as well as through physical contact between at least one other electrode of the at least two electrodes and the conductive surface.

38. The pointing device of claim 37, wherein, the buttons are situated on the pointing device so that they may be actuated by the fingers of a user when operating the pointing device.

39. The pointing device of claim 37, wherein the sensor for interpreting motion resides on the bottom of the pointing device for sensing when the pointing device is moved.

40. The pointing device of claim 37, wherein at least one electrode is situated on the bottom of the pointing device to couple to a conductive planar surface on which the pointing device is moved when being operated by the user.

41. The pointing device of claim 37, further comprising a control section, the control section including at least a USB interface section, a inter-body communication interface section, and a pointing device input control section, wherein the a inter-body communication interface section and the pointing device input control section are electronically coupled to the USB interface section.

42. A system, comprising:
- a portable computing device coupled to the arm of a user, the portable computing device comprising at least a body, a strap and at least two electrodes;
- a stationary computing device; and
- a pointing device coupled to the stationary computing device, the pointing device comprising at least two electrodes;
- the portable computing device sensing, through at least one of the two electrodes in the portable computing device, an electrical coupling to the pointing device;
- the portable computing device further transmitting an initialization message to the pointing device through a first electrode of the at least two electrodes in the portable computing device, the first electrode being in physical contact with the hand of the user;
- the pointing device receiving the initialization message through an electrode of the at least two electrodes in the pointing device that is contact with the user, and further sending a confirmation message back to the portable computing device through a second electrode of the at least two electrodes in the pointing device, the second electrode being in physical contact with a conductive planar surface;
- the portable computing device further receiving the confirmation message from the pointing device and establishing a communication link through a second electrode of the at least two electrodes in the portable computing device, the second electrode being in physical contact with the conductive planar surface; and
- the portable computing device further communicating information for the stationary computing device over the communication link by sending information through the first electrode and receiving information from the second electrode, wherein the pointing device converts the received information to a communication medium suitable for the computing device.

* * * * *